United States Patent
Baldemair (10) Patent No.: US 10,158,403 B2
(45) Date of Patent: Dec. 18, 2018

(54) RADIO PRECODING

(71) Applicant: Telefonaktiebolaget LM Ericsson (publ), Stockholm (SE)

(72) Inventor: Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/524,137

(22) PCT Filed: Nov. 5, 2015

(86) PCT No.: PCT/EP2015/075772
§ 371 (c)(1),
(2) Date: May 3, 2017

(87) PCT Pub. No.: WO2017/076446
PCT Pub. Date: May 11, 2017

(65) Prior Publication Data
US 2017/0359109 A1    Dec. 14, 2017

(51) Int. Cl.
*H04B 7/04* (2017.01)
*H04B 7/0456* (2017.01)
*H04B 7/06* (2006.01)
*H04L 27/26* (2006.01)

(52) U.S. Cl.
CPC ......... *H04B 7/0456* (2013.01); *H04B 7/0615* (2013.01); *H04L 27/2601* (2013.01); *H04L 27/2634* (2013.01)

(58) Field of Classification Search
CPC .. H04B 7/0456; H04B 7/0615; H04L 27/2601
See application file for complete search history.

(56) References Cited

U.S. PATENT DOCUMENTS

| | | | |
|---|---|---|---|
| 2004/0141548 A1* | 7/2004 | Shattil | H04L 1/04 375/146 |
| 2008/0002645 A1 | 1/2008 | Seki et al. | |
| 2009/0245222 A1 | 10/2009 | Sampath et al. | |
| 2011/0267956 A1* | 11/2011 | Yonge, III | H04L 12/413 370/241 |
| 2016/0211999 A1* | 7/2016 | Wild | H04L 27/264 |
| 2016/0269212 A1* | 9/2016 | Vilaipornsawai | H04L 27/2627 |

* cited by examiner

*Primary Examiner* — Kenneth Lam
(74) *Attorney, Agent, or Firm* — Murphy, Bilak & Homiller, PLLC (57) ABSTRACT

The present disclosure relates to a method performed in a radio device for transmitting a multi-carrier waveform comprising multi-carrier symbols. The method comprises precoding S2 the time domain waveform of the multi-carrier symbols to a plurality of transmitter antenna elements of the radio device. The precoding S2 comprises switching S2*b* from using S2*a* first set of precoder weights to using S2*c* a second set of precoder weights, different from the first set of weights. The switching S2*b* is done by use of at least one intermediate set of precoder weights during an interlude between two of the symbols in time domain. The method also comprises transmitting S3 the precoded signal from the transmitter antenna elements.

14 Claims, 5 Drawing Sheets

RADIO PRECODING

TECHNICAL FIELD

The present disclosure relates to precoding performed in a radio device for transmitting a multi-carrier waveform comprising multi-carrier symbols.

BACKGROUND

Orthogonal Frequency-Division Multiplexing (OFDM) has become a popular modulation system for wireless communications. It is likely that some variants of OFDM will also be used for 5G standards of the Third Generation Partnership Project (3GPP). OFDM includes modulation schemes based on OFDM, but where the data applied to subcarriers are precoded, e.g. Discrete Fourier Transform Spread (DFTS) OFDM.

In OFDM, a wideband communications channel is divided into a number of narrowband subcarriers. Since each subcarrier is narrowband, the effects of frequency selectivity can be reduced, if a cyclic prefix or guard interval is used they may be eliminated, i.e. data transmitted on one subcarrier does not interfere with data transmitted on other subcarriers.

If the transfer function of a subcarrier is inspected, it may be possible to see that its spectrum roll off is actually rather slow (it roughly decays with 1/frequency^2). The reason that two different subcarriers don't interfere is not that no energy of one subcarrier spreads into another subcarrier but due to the orthogonal properties of the subcarrier functions.

Figure 1A:
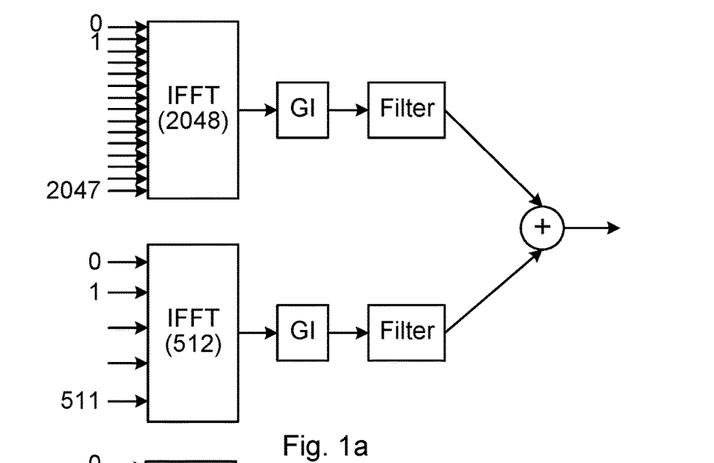
FIG. 1a is a schematic block diagram of an embodiment of filtered OFDM.

Typically the spectrum roll off achieved by the OFDM subcarrier function alone is not sufficient to meet certain requirements, e.g. the allowed out of band emissions. Therefore, the OFDM waveform is typically filtered to suppress out of band emissions. FIG. 1a shows a block diagram of filtered OFDM where two OFDM numerologies are mixed on the same carrier. The guard interval (GI) can alternatively to a guard interval be a cyclic prefix (CP), a known word etc. (all well known techniques in OFDM modulation). In the following the term guard interval is often used for all these techniques. 5G systems should be capable to support on the same carrier at the same time multiple services with different requirements. In some cases this implies that on the same carrier at the same time multiple OFDM signals, with different numerologies, e.g. subcarrier bandwidth, guard interval length, need to coexist. Subcarriers are then no longer orthogonal but start to interfere with each other. The amount of interference is determined by the spectrum roll off which, as stated earlier, is rather slow for OFDM. In this setup, each OFDM waveform is individually filtered to suppress interference towards subcarriers of the other OFDM numerology/ies.

Figure 1B:
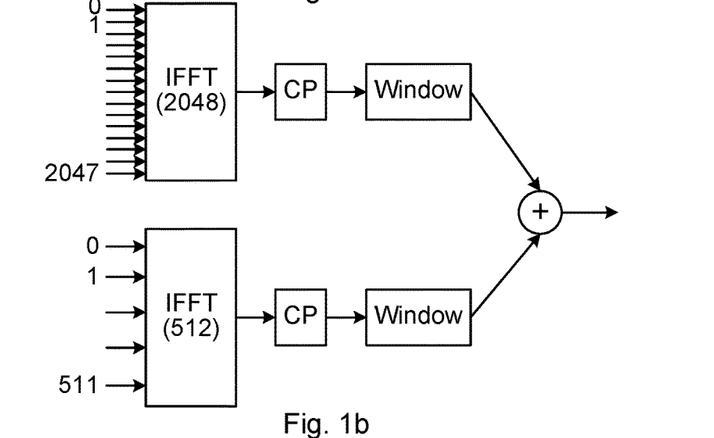
FIG. 1b is a schematic block diagram of an embodiment of windowed OFDM.

Instead of (or to complement) filtering, windowing can be applied to the OFDM waveform. FIG. 1b shows a block diagram of windowed OFDM with two OFDM numerologies that share the same carrier. Here a cyclic prefix is used.

Figure 2:
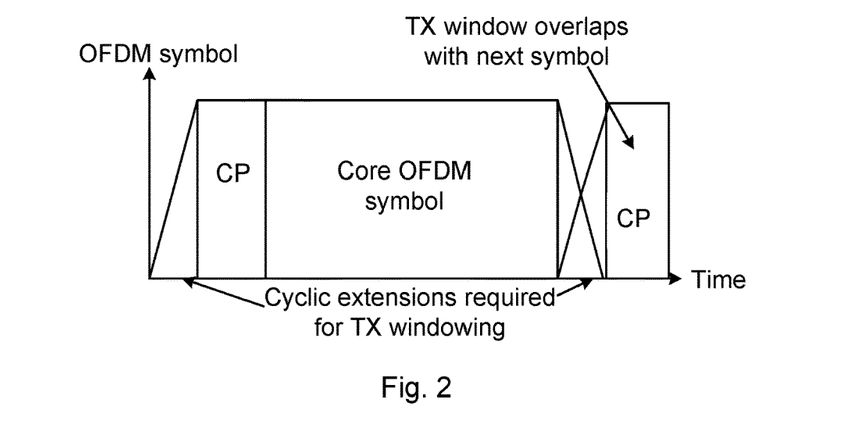
FIG. 2 is a schematic diagram of OFDM symbols with an interlude of a cyclic prefix including windowing.

FIG. 2 shows a schematic diagram of how windowing is done. The OFDM symbol is cyclic extended (both at the beginning and at the end) and a window is applied at the beginning and end of this extended symbol. Depending on the receiver processing, the cyclic suffix (i.e. the cyclic extension at symbol block end) matches the decaying window slope or is slightly longer. A typical windowed OFDM receiver discards the samples belonging to the windowed slopes and either proceeds with standard OFDM receiver processing or also applies receiver (Rx) windowing. Since the receiver discards the windowed samples, it is possible to overlap the rising slope of the next OFDM symbol with the falling slope of the current OFDM symbol and thus save some overhead, as shown in FIG. 2.

In FIG. 2, a cyclic extension is added both at the beginning and end of the symbol. However, windowing works as well if the cyclic extension is only added at the beginning or at the end (the single cyclic extension should in this case cover for the delay spread as well as windowing at both ends of the symbol, and if windowing at the receiver (Rx) is applied, also for Rx windowing).

Both windowing and filtering smoothen transitions from one OFDM symbol to the next, i.e. waveform discontinuities are reduced. The signal becomes smoother. A smooth time domain signal has less high-frequency components, therefore windowing and filtering improve the spectrum roll off.

The maximum achievable Signal-to-Interference-Plus-Noise Ratio (SINR) of a carrier that transmits OFDM waveforms with narrow and wide subcarriers is increased with windowing or individual filtering of each OFDM waveform. A windowed system achieves much higher SINR than the system without windowing since interference between subcarriers is suppressed. Also, the Power Spectral Density (PSD) of the OFDM subsystem can be studied and the PSDs of windowed waveforms decay much faster than waveforms without windowing.

Modern wireless communication systems use multi-antenna techniques to improve performance. The performance metric can either be data rate, coverage, robustness, or combinations thereof. Spatial multiplexing targets improved throughput, beamforming improved coverage, and transmit diversity improved robustness. Common to many multi-antenna schemes is precoding, i.e. that one signal layer is mapped to multiple antennas or antenna elements. The precoding or antenna weights may depend on the channel. Precoding can be done frequency selective, i.e. different precoding weights are applied to different frequencies, or wideband, i.e. the same precoder is applied across the used bandwidth. Wideband precoders are often implemented in time-domain after OFDM modulation. If applied in time-domain, the precoding can be done either in analogue/digital baseband, at some intermediate frequency, or radio frequency.

As described in the previous section, transmitter (Tx) windowing or filtering helps to make the signal discontinuities smoother and by that improve the spectrum roll off.

At OFDM symbol boundaries, the precoding weights can be changed to adopt to changed channel conditions or if the next symbol is transmitted towards a different receiver or set of receivers. If the precoding weights are applied in frequency-domain or in time-domain prior Tx filtering or windowing the discontinuity introduced by precoder weight switching can be seen as part of the regular discontinuity between OFDM symbols and will be handled by a subsequent Tx filtering or windowing operation.

Figure 3:
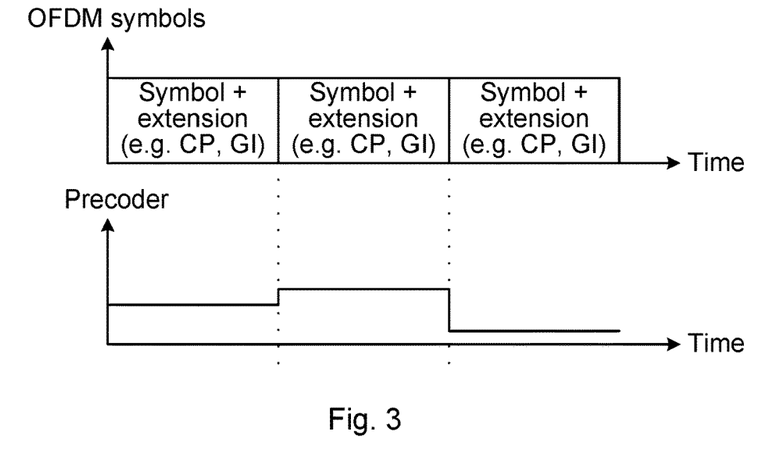
FIG. 3 is a schematic diagram illustrating switching of precoder weight sets between different symbols.
Figure 4:
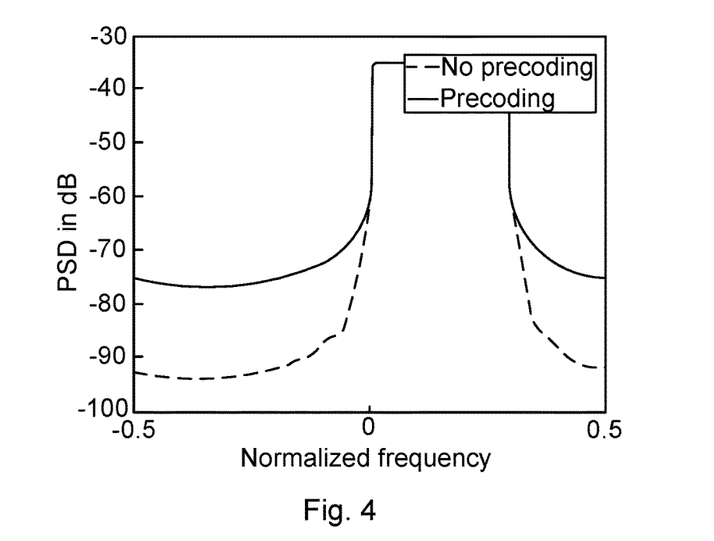
FIG. 4 is a schematic graph comparing PSD of a windowed waveform with and without precoding applied after windowing.

The situation is different if precoding and changing of precoder weights is done after Tx filtering or windowing. FIG. 3 schematically shows where precoder weights are changed. The PSD of a Tx windowed OFDM system without changing precoders may be compared with a system with changing precoders whereby it can be seen that spectrum regrowth occurs. As shown in FIG. 4, the windowed waveform without precoding (or constant precoder) has a steeper spectrum roll-off. With changing precoding, the PSD of a windowed system is similar to a system without windowing.

The precoder changes introduce signal discontinuities. Since the precoder changes and thus the signal discontinuities happen after Tx windowing or filtering they are not smoothed out but remain as a discontinuity in the transmitted signal. These discontinuities lead to spectrum regrowth.

Changing of precoder weights after TX filtering or windowing typically happens for analogue beamformers (in baseband, Intermediate Frequency (IF), or Radio Frequency (RF)).

SUMMARY

It is an objective of the present disclosure to achieve an improved waveform of multi-carrier symbols when using precoding, especially when switching from a first set of precoder weights to a second set of precoder weights. A set of precoder weights are the respective weights for each antenna or antenna element used simultaneously at any time by the transmitter. The number of weights in a set thus depend on the number of antennas or antenna elements used for transmitting the waveform signal.

In case of Tx windowed OFDM, the receiver typically discards the first and last part of each symbol block since this part is distorted by the applied window and also contains inter-symbol interference. According to the present disclosure, instead of applying the precoder weight switching abruptly, it is proposed to make the transition from a first set of weights to a second set of weights more gradually during the switching, i.e. the transition from a first set of precoder weights to a second set of precoder weights is done via at least one intermediate set of precoder weights, whereby the transition may be stepwise, continuous, or gradual e.g. forming a gradient (in phase and/or magnitude) between the first and second sets of precoder weights. Thereby, less signal discontinuity is introduced and the spectrum regrowth may be reduced.

If a transmitter applies Tx filtering, the transmitter may change precoder weights gradually at the beginning of the guard interval or other interlude between the symbols so as not to interfere with the signal of the symbols.

According to an aspect of the present disclosure, there is provided a method performed in a radio device for transmitting a multi-carrier waveform comprising multi-carrier symbols. The method comprises precoding the time domain waveform of the multi-carrier symbols to a plurality of transmitter antenna elements of the radio device. The method also comprises transmitting the precoded signal from the transmitter antenna elements. The precoding comprises switching from using a first set of precoder weights to using a second set of precoder weights, different from the first set of weights. The switching is done by use of at least one intermediate set of precoder weights during an interlude between two of the symbols in time domain.

According to another aspect of the present disclosure, there is provided a radio device comprising processor circuitry, and storage storing instructions executable by said processor circuitry whereby said radio device is operative to precode the time domain waveform of the multi-carrier symbols to a plurality of transmitter antenna elements of the radio device. The radio device is also operative to transmit the precoded signal from the transmitter antenna elements. The precoding comprises switching from using a first set of precoder weights to using a second set of precoder weights, different from the first set of weights. The switching is done by use of at least one intermediate set of precoder weights during an interlude between two of the symbols in time domain.

According to another aspect of the present disclosure, there is provided a computer program product comprising computer-executable components for causing a radio device to perform an embodiment of the method of the present disclosure when the computer-executable components are run on processor circuitry comprised in the radio device.

According to another aspect of the present disclosure, there is provided a computer program for transmitting a multi-carrier waveform comprising multi-carrier symbols. The computer program comprises computer program code which is able to, when run on processor circuitry of a radio device, cause the radio device to precode the time domain waveform of the multi-carrier symbols to a plurality of transmitter antenna elements of the radio device. The code is also able to cause the radio device to transmit the precoded signal from the transmitter antenna elements. The precoding comprises switching from using a first set of precoder weights to using a second set of precoder weights, different from the first set of weights. The switching is done by use of at least one intermediate set of precoder weights during an interlude between two of the symbols in time domain.

According to another aspect of the present disclosure, there is provided a computer program product comprising an embodiment of a computer program of the present disclosure and a computer readable means on which the computer program is stored.

Embodiments of the present disclosure facilitates combining Tx filtered or windowed OFDM with Multiple Input, Multiple Output (MIMO) schemes, especially if precoding happens in analogue domain. By that, the advantage of MIMO/beamforming (higher spectral efficiency, improved link budget, better interference isolation, improved reliability) may be combined with the advantages of Tx windowed or filtered OFDM such as lower out-of-band emissions which enables mixing of services or better utilization of a given channel.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 5:
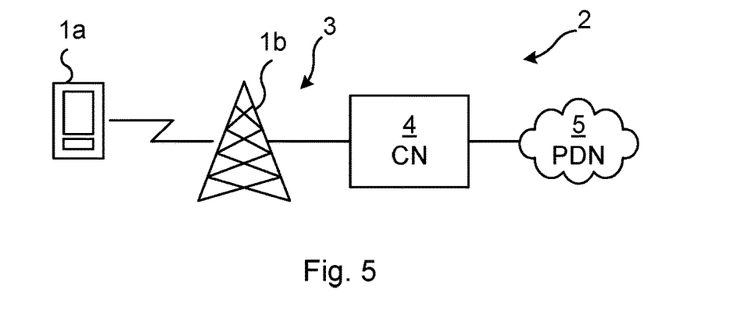
FIG. 5 is a schematic block diagram of an embodiment of a communication system in accordance with the present disclosure.

FIG. 5 illustrates an embodiment of a communication system 2 in which embodiments of the present disclosure may be used. The communication system is a telecommunication system comprising a Core Network (CN) 4 and a cellular Radio Access Network (RAN) 3, e.g. in accordance with a 3GPP standard. However, embodiments of the present disclosure may be used with any type of radio communication network, e.g. Wireless Local Area Network (WLAN). The RAN 3 comprises at least one or a plurality of radio devices 1 in the form of base stations 1b, e.g. an evolved Node B (eNB) of a Long Term Evolution (LTE) communication standard, or another present or future radio communication standard. The base station 1b is configured for providing access to a Packet Data Network (PDN) 5, e.g. the Internet, via the communication system 2, to at least one radio device 1 in the form of a terminal or User Equipment (UE) 1a, e.g. a smartphone.

Thus, the radio device 1 discussed herein may be any device, e.g. base station 1b or UE 1a, mobile or stationary, enabled to communicate over a radio channel in a communication network, for instance but not limited to e.g. Node B, eNB, mobile phone, smartphone, modem, sensors, meters, actuators, vehicles (e.g. a car), household appliances, medical appliances, media players, cameras, or any type of consumer electronic, for instance but not limited to television, radio, lighting arrangements, tablet computer, laptop, or personal computer (PC). In some embodiments of the present disclosure, the radio device 1 is a user equipment 1a, a base station 1b, a Machine-to-Machine (M2M) device, or a relay node.

The radio device 1 uses precoding to a plurality of antennas or antenna elements of the radio device.

Figure 6A:
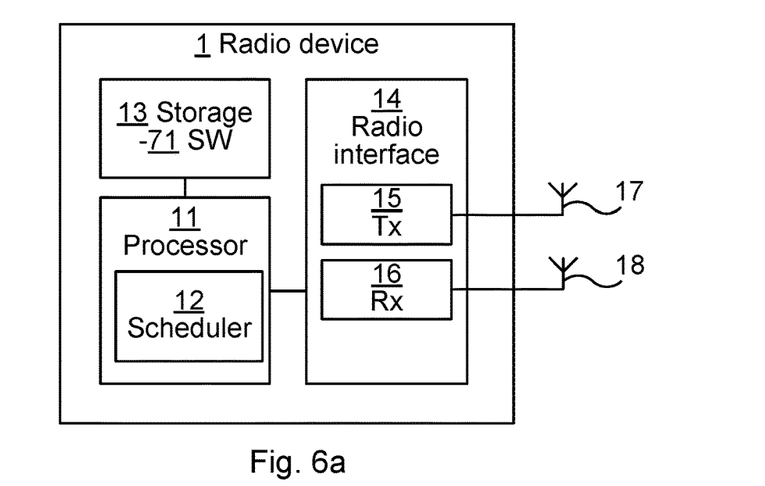
FIG. 6a is a schematic block diagram of an embodiment of a radio device 1n accordance with the present disclosure.

FIG. 6a schematically shows an embodiment of a radio device 1 of the present disclosure. The radio device 1 comprises processor circuitry 11 e.g. a central processing unit (CPU). The processor circuitry 11 may comprise one or a plurality of processing units in the form of microprocessor(s). However, other suitable devices with computing capabilities could be comprised in the processor circuitry 11, e.g. an application specific integrated circuit (ASIC), a field programmable gate array (FPGA) or a complex programmable logic device (CPLD). The processor circuitry 11 is configured to run one or several computer program(s) or software (SW) 71 (see also FIG. 7) stored in a storage 13 of one or several storage unit(s) e.g. a memory. Thus, the SW 71 may e.g. comprise computer programs for a scheduler 12 which may be formed in the processor circuitry 11 when the processor circuitry runs said computer programs. The scheduler 12 may comprise a scheduler for scheduling the transmitting of the precoded signal discussed herein. The storage unit is regarded as a computer readable means 72 (see FIG. 7) as discussed herein and may e.g. be in the form of a Random Access Memory (RAM), a Flash memory or other solid state memory, or a hard disk, or be a combination thereof. The processor circuitry 11 may also be configured to store data in the storage 13, as needed. The radio device 1 also comprises a radio interface 14 comprising a transmitter Tx 15 and a receiver Rx 16 which may be combined to form a transceiver or be present as distinct units within the radio device 1. The transmitter 15 is configured to cooperate with the processor circuitry to transform data bits to be transmitted over the radio interface 14 to a suitable radio signal in accordance with the radio access technology (RAT) used by the RAN 3 via which the data bits are to be transmitted. The receiver 16 is configured to cooperate with the processor circuitry 11 to transform a received radio signal to data bits. The transmitter is associated with a plurality of antenna elements 17 in one or a plurality of transmitter antennas. Similarly, the receiver 16 may be associated with a plurality of antenna elements 18 in one or a plurality of receiver antennas, which may be the same or different physical antenna(s) as the transmitter antenna(s) 17. The transmitter antenna(s) may comprise a single antenna element 17 or a plurality of antenna elements 17, to provide the plurality of antenna elements of the present disclosure, e.g. for different frequencies and/or for MIMO (Multiple Input Multiple Output) communication. The antenna elements 17 is used by the transmitter 15 for transmitting the precoded radio signals discussed herein.

According to an aspect of the present disclosure, there is provided a radio device 1 comprising processor circuitry 11, and storage 13 storing instructions 71 executable by said processor circuitry whereby said radio device is operative to precode the time domain waveform of the multi-carrier symbols to a plurality of transmitter 15 antenna elements 17 of the radio device 1. The radio device is also operative to transmit the precoded signal from the transmitter antenna elements 17. The precoding comprises switching from using a first set of precoder weights to using a second set of precoder weights, different from the first set of weights. The switching is done by use of at least one intermediate set of precoder weights during an interlude between two of the symbols in time domain.

In some embodiments of the present disclosure, the radio device is also operative to smooth the time-domain waveform, e.g. by means of windowing or filtering, for reducing emissions outside of an allocated bandwidth, before the precoding.

In some embodiments of the present disclosure, the radio device 1 is a multi-antenna radio device. Alternatively, the radio device has a single transmit antenna comprising a plurality of antenna elements 17.

Figure 6B:
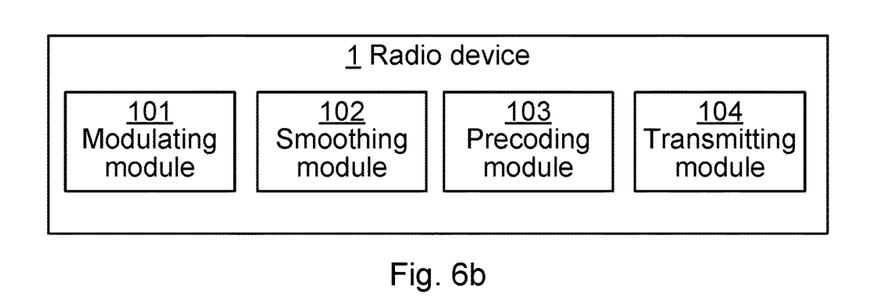
FIG. 6b is a schematic functional block diagram of an embodiment of a radio device 1n accordance with the present disclosure.

FIG. 6b is a schematic block diagram functionally illustrating an embodiment of the radio device 1 in FIG. 6a. As previously mentioned, the processor circuitry 11 may run software 71 for enabling the radio device 1 to perform an embodiment of the method of the present disclosure, whereby functional modules may be formed in radio device 1 e.g. in the processor circuitry 11 for performing the different steps of the method. These modules are schematically illustrated as blocks within the radio device 1. Thus, the radio device 1 comprises a precoding module 103 for precoding the time domain waveform of the multi-carrier symbols to a plurality of transmitter 15 antenna elements 17 of the radio device 1. The precoding module 103 is configured for performing the precoding such that it comprises switching from using a first set of precoder weights to using a second set of precoder weights, different from the first set of weights, wherein the switching is done by use of at least one intermediate set of precoder weights during an interlude between two of the symbols in time domain. The radio device also comprises a transmitting module 104 (typically cooperating with the transmitter 15) for transmitting the precoded signal from the transmitter antenna elements 17.

In some embodiments, the radio device 1 also comprises a smoothing module 102 for smoothing the time-domain waveform for reducing emissions outside of an allocated bandwidth, before the precoding. In some embodiments, the radio device 1 also comprises a modulating module 101 for modulating at least one subcarrier of the multi-carrier symbols to form the time domain waveform, before the smoothing.

Alternatively, the modules 101-104 may be formed by hardware, or by a combination of software and hardware.

According to an aspect of the present disclosure, there is provided a radio device 1 comprising means 103 for precoding a time domain waveform of multi-carrier symbols to a plurality of transmitter 15 antenna elements 17 of the radio device 1. The precoding comprises switching from using a first set of precoder weights to using a second set of precoder weights, different from the first set of weights. The switching is done by use of at least one intermediate set of precoder weights during an interlude between two of the symbols in time domain. The radio device also comprises means 104 for transmitting the precoded signal from the transmitter antenna elements 17. In some embodiments, the radio device 1 also comprises means 102 for smoothing the time-domain waveform for reducing emissions outside of an allocated bandwidth, before the precoding. In some embodiments, the radio device 1 also comprises means 101 for modulating at least one subcarrier of the multi-carrier symbols to form the time domain waveform, before the smoothing.

Figure 7:
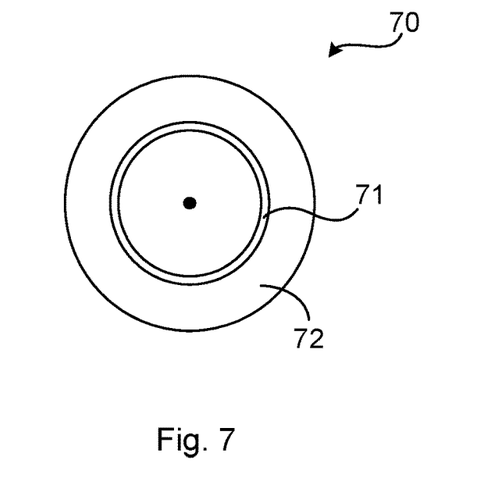
FIG. 7 is a schematic illustration of an embodiment of a computer program product in accordance with the present disclosure.

FIG. 7 illustrates an embodiment of a computer program product 70. The computer program product 70 comprises a computer readable (e.g. non-volatile and/or non-transitory) medium 72 comprising software/computer program 71 in the form of computer-executable components. The computer program 71 may be configured to cause a radio device 1, e.g. as discussed herein, to perform an embodiment of the method of the present disclosure. The computer program may be run on the processor circuitry 11 of the radio device 1 for causing it to perform the method. The computer program product 70 may e.g. be comprised in a storage unit or memory 13 comprised in the radio device 1 and associated with the processor circuitry 11. Alternatively, the computer program product 70 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 70 comprising computer-executable components 71 for causing a radio device 1 to perform an embodiment of the method of the present disclosure when the computer-executable components are run on processor circuitry 11 comprised in the radio device.

According to another aspect of the present disclosure, there is provided a computer program 71 for transmitting a multi-carrier waveform comprising multi-carrier symbols. The computer program comprises computer program code which is able to, when run on processor circuitry 11 of a radio device 1, cause the radio device to precode the time domain waveform of the multi-carrier symbols to a plurality of transmitter 15 antenna elements 17 of the radio device 1. The code is also able to cause the radio device to transmit the precoded signal from the transmitter antenna elements 17. The precoding comprises switching from using a first set of precoder weights to using a second set of precoder weights, different from the first set of weights. The switching is done by use of at least one intermediate set of precoder weights during an interlude between two of the symbols in time domain.

In some embodiments, the computer program code is also able to cause the radio device 1 to smooth the time-domain waveform for reducing emissions outside of an allocated bandwidth, before the precoding.

According to another aspect of the present disclosure, there is provided a computer program product 70 comprising an embodiment of the computer program 71 of the present disclosure and a computer readable means 72 on which the computer program is stored.

Figure 8A:
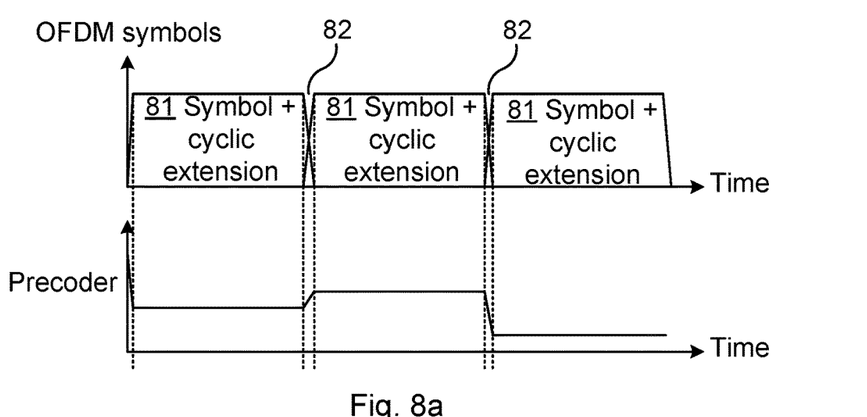
FIG. 8a is a schematic diagram of an embodiment of a gradual switch between precoder weights for a windowed waveform.
Figure 8B:
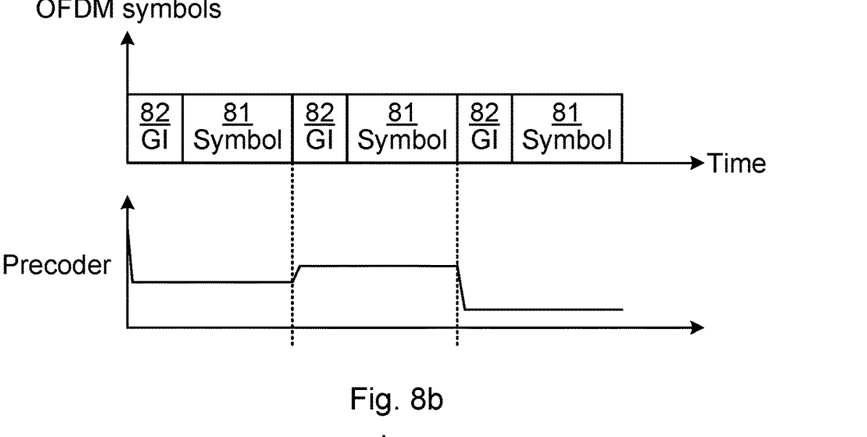
FIG. 8b is a schematic diagram of an embodiment of a gradual switch between precoder weights for a filtered waveform.

FIG. 8a illustrates gradual switching between precoder weights if Tx windowing is applied. Similarly, FIG. 8b illustrates gradual switching between precoder weights if Tx filtering is applied. Symbols 81 are separated by interludes 82 e.g. in the form of GIs, depending on smoothing technique used. Specifically, in FIG. 8a, symbols 81 are separated by cyclic extensions and the interlude 82 where the gradual switching is done is part of said cyclic extensions. Specifically, in FIG. 8b, symbols 81 are separated by guard intervals and the interlude 82 where the gradual switching is done is part of said guard interval.

Since Tx windowing or filtering cannot be used to reduce the discontinuities introduced by switching between precoder weights (since the switching is done after Tx windowing or filtering, as discussed above) the switching itself is done in a gradual way to minimize signal discontinuities. FIGS. 8a and 8b show how the precoder weights are switched between if Tx windowing and Tx filtering, respectively, is applied. If Tx windowing is applied, the switch between precoder weights may be done gradually (e.g. step-wise or essentially continuously, as discussed herein) during a part of the windowing time, as shown in FIG. 8a. If Tx filtering is applied, the switch between precoder weights may be done gradually (e.g. step-wise or essentially continuously, as discussed herein) during the beginning of the guard interval, see FIG. 8b.

Figure 9:
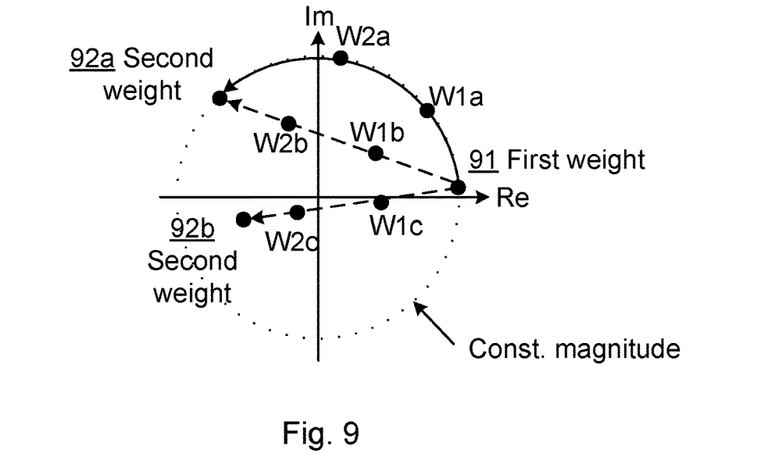
FIG. 9 illustrates embodiments of switches between precoder weights in a complex plane.

FIG. 9 illustrates a switch between precoder weights of an antenna element 17 in a complex plane, from a first weight 91 of a first set of precoder weights 91 to a second weight 92 of a second set of precoder weights 92. Transitions in the complex plane from a first weight 91 to a second weight 92 during the switching of one antenna element 17 are shown, but corresponding transitions are performed also for the other antenna elements of the radio device from a respective first weight 91 to a respective second weight 92. Solid arrow: This trajectory involves only a phase change. Dashed arrow to second precoder weight 92a: During the switching, the precoder weight changes magnitude, but start and end precoder weights 91 and 92a have same magnitude. Dashed arrow to second precoder weight 92b: Start and end precoder weights 91 and 92b have different magnitudes, whereby the switching involves both a magnitude and phase change.

If the switch between precoder weights is a pure phase switch (i.e. no amplitude change), a gradual switching could be a (linear) ramp from phase of first precoder weights 91 to phase of second precoder weights 92. Other functions enabling a continuous transition from phase of first precoder weight 91 to phase of second precoder weight 92 may be envisioned as well. If both precoder weights 91 and 92 have the same magnitude, a pure phase change can be envisioned by a trajectory along a circle in the complex plain from the first precoder weight 91 to the second precoder weight 92a, see solid line trajectory along the dotted circle in FIG. 9. Another possibility may, if or if not both precoder weights 91 and 92 have the same magnitude, be to choose a trajectory in the complex plane not following the circle, see dashed trajectories to second precoder weights 92a and 92b, respectively. In this case, the switch between precoder weights also changes magnitude during the switching. Preferably, both phase and magnitude transitions during the switching are gradual to reduce discontinuities.

In accordance with the present disclosure, the switching is done gradually via at least one intermediate set of precoder weights W which in time domain is used for a duration between the first set of weights 91 and the second set of weights 92. In FIG. 9, this is illustrated by two intermediate precoder weights W1 and W2 used sequentially for durations of time during the switching of each of the three switchings illustrated in the figure.

Solid arrow: This trajectory involves only a phase change along the dotted circle in the complex plane, via the first intermediate precoder weight W1a (used for a predetermined first duration of time) and the second intermediate precoder weight W2a (used for a predetermined second duration of time, subsequent to the first duration of time).

Dashed arrow to second precoder weight 92a: During the switching, the precoder weight changes magnitude, but start and end precoder weights 91 and 92a have same magnitude. The phase and magnitude changes are both done gradually via the first intermediate precoder weight W1b (used for a predetermined first duration of time) and the second intermediate precoder weight W2b (used for a predetermined second duration of time, subsequent to the first duration of time).

Dashed arrow to second precoder weight 92b: Start and end precoder weights 91 and 92b have different magnitudes, whereby the switching involves both a magnitude and phase change. The phase and magnitude changes are both done gradually via the first intermediate precoder weight W1b (used for a predetermined first duration of time) and the second intermediate precoder weight W2b (used for a predetermined second duration of time, subsequent to the first duration of time).

Figure 10:
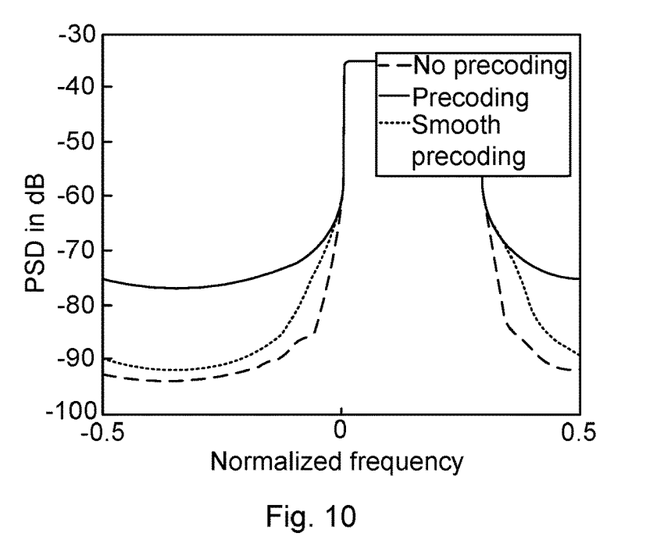
FIG. 10 is a schematic graph comparing PSD of windowed OFDM waveforms without precoding, with regular precoding and with precoding in accordance with the present disclosure.

FIG. 10 shows the PSD of an OFDM waveform with Tx windowing. Dashed line: with constant precoder weights or no precoding. Solid line: with non-gradual switching between precoder weights, i.e. not in accordance with the present disclosure. Dotted line: with gradual switching between precoder weights in accordance with the present disclosure. The PSD of OFDM waveform without Tx windowing overlaps the PSD of an OFDM system with windowing and precoding with non-gradual switching between precoder weights (and is therefore not shown). It can be seen that non-gradual switchings destroy the Tx windowing benefits. The PSD of non-gradual switching is similar to the PSD of the waveform without windowing.

Figure 11A:
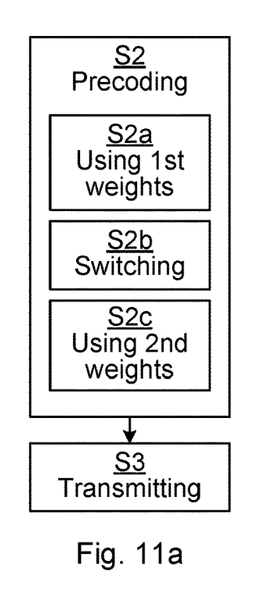
FIG. 11a is a schematic flow chart of an embodiment of the method of the present disclosure.

FIG. 11a is a flow chart of an embodiment of the method of the present disclosure. The method is performed in a radio device 1 for transmitting a multi-carrier waveform comprising multi-carrier symbols 81. The radio device 1 precodes S2 the time domain waveform of the multi-carrier symbols 81 to a plurality of transmitter 15 antenna elements 17 of the radio device 1. The time domain waveform may e.g. have been formed by the radio device modulating at least one subcarrier of the multi-carrier symbols. The precoding S2 comprises switching S2b from using S2a a first set of precoder weights 91 to using S2c a second set of precoder weights 92, different from the first set of weights. The switching S2b is done by use of at least one intermediate set of precoder weights during an interlude 82 between two of the symbols 81 in time domain. The radio device 1 also transmits S3 the precoded S2 signal from the transmitter antenna elements 17.

Figure 11B:
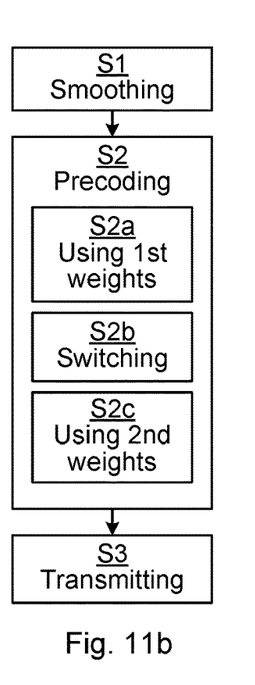
FIG. 11b is a schematic flow chart of another embodiment of the method of the present disclosure.

In some embodiments, as illustrated in FIG. 11b, the radio device 1 also smooths S1 the time-domain waveform for reducing emissions outside of an allocated bandwidth, e.g. of a subcarrier or group of subcarriers, before the precoding S2. In some embodiments, the smoothing S1 comprises filtering or windowing.

Figure 11C:
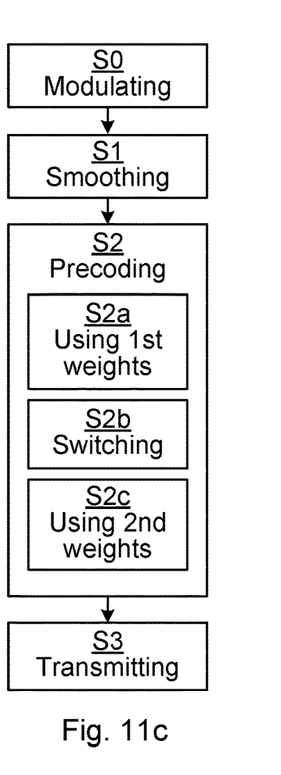
FIG. 11c is a schematic flow chart of another embodiment of the method of the present disclosure.

In some embodiments, as illustrated in FIG. 11c, the radio device also modulates S0 at least one subcarrier of the multi-carrier symbols to form the time domain waveform, before the smoothing S1.

In some embodiments of the present disclosure, the switching S2b comprises determining the at least one intermediate set of precoder weights and a duration of time during which the determined intermediate set of precoder weights should be used. By determining the intermediate weights (i.e. values thereof) and duration appropriately, the transition between the first set of weights 91 and the second set of weights 92 may be made more gradually, e.g. in smaller steps than if the switching is done in a single (abrupt) step. In some embodiments, the at least one intermediate set of precoder weights comprises a plurality of intermediate sets, whereby the switching S2b comprises determining each of the plurality of intermediate sets of precoder weights and a duration of time during which each of the determined intermediate sets of precoder weights should be used. This may ensure an even more gradual transition between precoder weights during the switching, e.g. in smaller steps. Additionally or alternatively, in some embodiments, the at least one intermediate set of precoder weights is/are determined such that the switching S2b is done gradually from the first set of precoder weights to the second set of precoder weights. This implies that the intermediate set weights are determined such that they conform to an imagined gradient between the first set of weights 91 and the second set of weights 92 with regard to phase and or amplitude (cf. the complex plane discussed in relation to FIG. 9).

The transition from one first set of precoder weights 91 to a second set of precoder weights 92 may involve more than one set of intermediate weights W, such as a plurality of intermediate precoder weights. Said plurality of intermediate precoder weights may give a phased or gradual transition between the first set of precoder weights and the second set of precoder weights. By augmenting the number of sets of intermediate precoder weights, the transition might go from a phased, step-wise transition towards a more continuous, even transition from the first set of precoder weights to the second set of precoder weights. If the number of said plurality of intermediate sets of precoder weights is great enough, the transition may be essentially a continuous transition from the first set of precoder weights to the second set of precoder weights. Since a more gradual transition between the first and second sets of precoder weights may result in less spectrum regrowth, the number of intermediate precoder weight sets affect the magnitude of spectrum regrowth attained. By altering the number of intermediate precoder weights and the respective durations they are used, the resulting spectrum regrowth may be managed or controlled, at least to a degree. Depending on the distance in magnitude and/or phase (in a complex plane) between the first set of precoder weights and the second set of precoder weights, the number of intermediate sets of precoder weights could be chosen accordingly, to achieve a tolerable level of spectrum regrowth. How many intermediate precoder weight sets that are needed to get a desired reduction in spectrum regrowth when switching S2b from the first set of precoder weights to the second set of precoder weights may depend on many factors, such as the distance in magnitude and/or phase between the first and second set of precoder weights and the existing spectrum regrowth before smoothing the waveform. Thus, the number of intermediate precoder weight sets which are required in an situation to achieve an acceptable level of spectrum regrowth may be depending on the situation.

The multi-carrier symbols 81 may be any type of symbols but may, in some embodiments, typically be OFDM symbols or precoded OFDM symbols.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a radio device for transmitting a multi-carrier waveform comprising multi-carrier symbols, the method comprising:
   precoding a time domain waveform of the multi-carrier symbols to a plurality of transmitter antenna elements of the radio device, to obtain a precoded signal; and
   transmitting the precoded signal from the transmitter antenna elements;
   wherein the precoding comprises switching from using a first set of precoder weights to using a second set of precoder weights, different from the first set of weights, and
   wherein the switching is done by use of at least one intermediate set of precoder weights during an interlude between two of the multi-carrier symbols in the time domain.

2. The method of claim 1, further comprising:
   smoothing the time domain waveform for reducing emissions outside of an allocated bandwidth, before the precoding.

3. The method of claim 2, wherein the smoothing comprises one of filtering and windowing.

4. The method of claim 1, wherein the switching comprises determining the at least one intermediate set of precoder weights and a duration of time during which the determined intermediate set of precoder weights should be used.

5. The method of claim 4, wherein the at least one intermediate set of precoder weights comprises a plurality of intermediate sets, whereby the switching comprises determining each of the plurality of intermediate sets of precoder weights and a duration of time during which each of the determined intermediate sets of precoder weights should be used.

6. The method of claim 4, wherein the at least one intermediate set of precoder weights is determined such that the switching is done gradually from the first set of precoder weights to the second set of precoder weights.

7. The method of claim 1, wherein the radio device is a multi-antenna radio device.

8. The method of claim 1, wherein the multi-carrier symbols are OFDM symbols or precoded OFDM symbols.

9. A radio device comprising:
   processor circuitry; and
   storage storing instructions executable by said processor circuitry, whereby said radio device is operative to:
   precode a time domain waveform of multi-carrier symbols to a plurality of transmitter antenna elements of the radio device, to obtain a precoded signal; and
   transmit the precoded signal from the transmitter antenna elements;
   wherein the precoding comprises switching from using a first set of precoder weights to using a second set of precoder weights, different from the first set of weights, and
   wherein the switching is done by use of at least one intermediate set of precoder weights during an interlude between two of the multi-carrier symbols in the time domain.

10. The radio device of claim 9, wherein the radio device is also operative to:
  smooth the time-domain waveform for reducing emissions outside of an allocated bandwidth, before the precoding.

11. The radio device of claim 9, wherein the radio device is a multi-antenna radio device.

12. The radio device of claim 9, wherein the radio device is one of a user equipment, a base station, a Machine-to-Machine (M2M) device, and a relay node.

13. A non-transitory computer readable medium storing a computer program for transmitting a multi-carrier waveform comprising multi-carrier symbols, the computer program comprising computer program code that, when run on processor circuitry of a radio device, causes the radio device to:
  precode a time domain waveform of the multi-carrier symbols to a plurality of transmitter antenna elements of the radio device, to obtain a precoded signal; and
  transmit the precoded signal from the transmitter antenna elements;
  wherein the precoding comprises switching from using a first set of precoder weights to using a second set of precoder weights, different from the first set of weights, and
  wherein the switching is done by use of at least one intermediate set of precoder weights during an interlude between two of the multi-carrier symbols in time domain.

14. The non-transitory computer readable medium of claim 13, wherein the computer program comprises computer program code to cause the radio device to:
  smooth the time-domain waveform for reducing emissions outside of an allocated bandwidth, before the precoding.

\* \* \* \* \*